United States Patent
Ouchi et al.

(10) Patent No.: US 8,325,292 B2
(45) Date of Patent: *Dec. 4, 2012

(54) BACKLIGHT UNIT AND LIQUID CRYSTAL DISPLAY DEVICE USING THE SAME

(75) Inventors: Satoshi Ouchi, Kamakura (JP); Koichi Sakita, Chigasaki (JP); Hajime Inoue, Yokohama (JP); Seiji Murata, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,551

(22) Filed: Dec. 30, 2011

(65) Prior Publication Data

US 2012/0147294 A1 Jun. 14, 2012

Related U.S. Application Data

(63) Continuation of application No. 12/684,875, filed on Jan. 8, 2010, now Pat. No. 8,111,354.

(30) Foreign Application Priority Data

Feb. 20, 2009 (JP) .................................. 2009-038094

(51) Int. Cl.
*G02F 1/1335* (2006.01)
(52) U.S. Cl. ................ 349/62; 349/64; 349/65; 349/66; 349/67
(58) Field of Classification Search .................... 349/62, 349/64–67
See application file for complete search history.

(56) References Cited

U.S. PATENT DOCUMENTS

| 6,241,358 | B1 | 6/2001 | Higuchi et al. |
| 7,940,350 | B2 | 5/2011 | Jeong |
| 8,111,354 | B2 * | 2/2012 | Ouchi et al. ................ 349/65 |
| 2007/0058393 | A1 | 3/2007 | Kim et al. |
| 2007/0247871 | A1 | 10/2007 | Yoo |
| 2008/0231774 | A1 | 9/2008 | Tomita et al. |
| 2009/0185109 | A1 | 7/2009 | Yoon et al. |

FOREIGN PATENT DOCUMENTS

| JP | 2008-103162 | 5/2008 |
| JP | 2008-103200 | 5/2008 |

* cited by examiner

*Primary Examiner* — Phu Vu
(74) *Attorney, Agent, or Firm* — Kilpatrick Townsend & Stockton LLP

(57) ABSTRACT

A backlight unit having a LED light source which includes a light guide plate partitioned in areas having a tapered shape formed of a thick and thin portion. The light guide plate forms a thick and thin portion repeated at certain intervals, and the repeated thick portions and the repeated thin portions gradually decrease in thickness. The LED light source is attached to a lateral side of thick portions. Grooves are formed in the light irradiation direction of the LED light source and in a direction perpendicularly intersecting the light irradiation direction. Each of the grooves is formed in an concave shape. There is a relation 0.2/30<=W/D<0.1 where D denotes the distance between the light guide plate and a light diffusion plate, and W denotes the width of each of the grooves. An inclination angle θ relative to the center of each of the grooves is between 9 and 15 degrees inclusive.

3 Claims, 13 Drawing Sheets

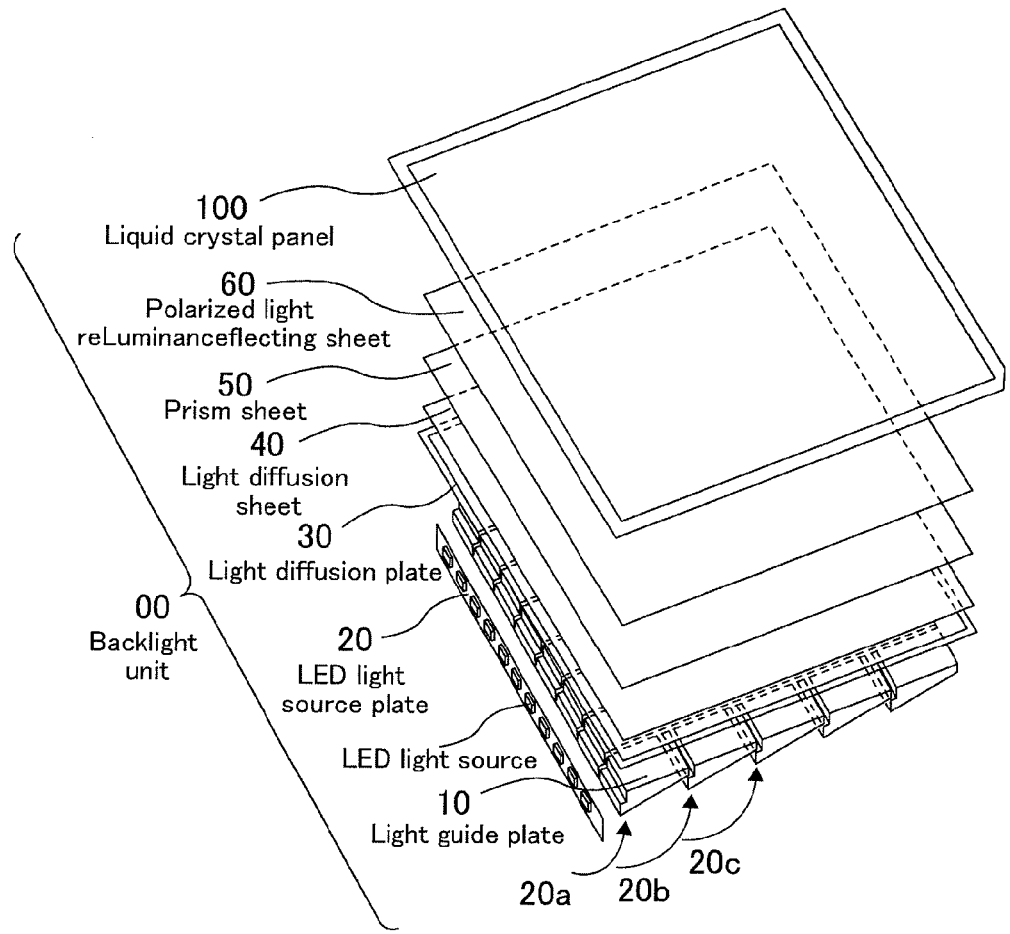
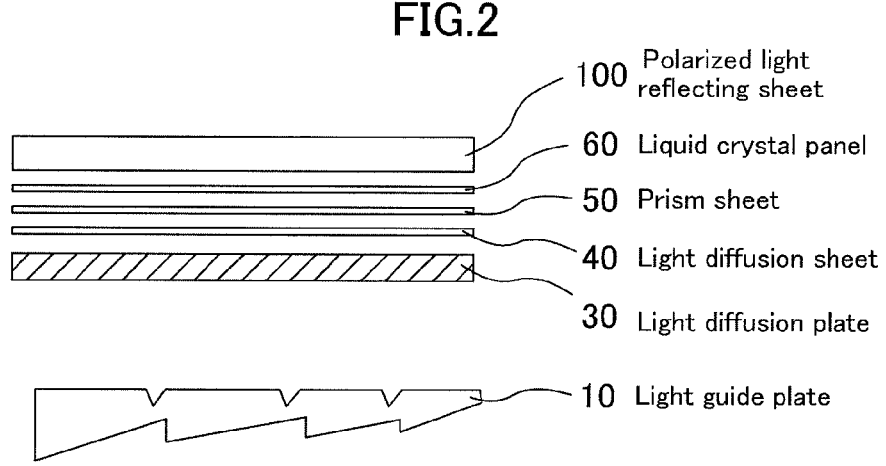

Depth 1mm
Thickness 3mm

Depth 0.4mm
Thickness 0.6mm

FIG.11
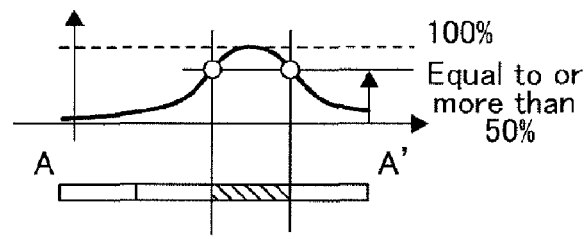
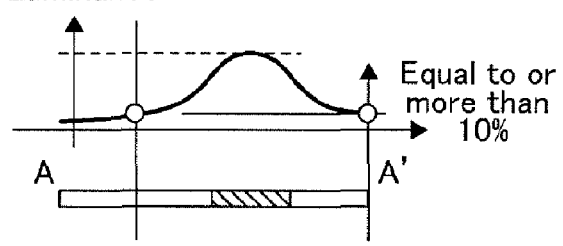
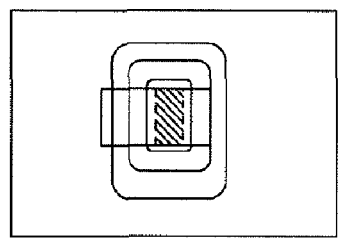
FIG.12
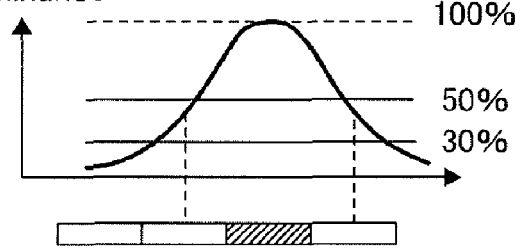

Light guide plate displayed on a screen

BACKLIGHT UNIT AND LIQUID CRYSTAL DISPLAY DEVICE USING THE SAME

CLAIMS OF PRIORITY

This application is a continuation application of U.S. patent application Ser. No. 12/684,875, filed on Jan. 8, 2010, which claims priority from Japanese Patent Application No. JP2009-038094, filed on Feb. 20, 2009, the content of which is hereby incorporated by reference into this application.

BACKGROUND OF THE INVENTION (1) Field of the Invention

The present invention relates to a backlight unit and a liquid crystal display device using the same. More particularly, the present invention relates to a backlight unit using a light-emitting diode (LED) light source suitable for an application for uniformly reproducing an image on a panel, and a liquid crystal display device using the same.

(2) Description of the Related Art

Conventionally, a fluorescence lamp such as a cold cathode fluorescent lamp (CCFL) and an external electrode fluorescent lamp (EEFL) have been used as a light source of a backlight unit which irradiates a liquid crystal display (LCD) device.

However, recent years have seen a trend that a light-emitting diode (LED) is used as a light source of a backlight unit of a liquid crystal display device. The LED is a semiconductor element that emits light when a forward voltage is applied. The LED provides a longer operating life and a simpler structure than conventional light emitting elements (for example, CCFL, EEFL) materials, thus allowing mass-production in low cost. Further, the LED also provides low power consumption and favorable color reproducibility.

Common backlight units are classified into two types: the direct type which arranges a light source under a liquid crystal panel, and the edge light type which arranges a light source on a lateral side of a liquid crystal panel. JP-A-2007-293339 discusses an edge light type backlight unit having a LED light source.

The backlight unit discussed in JP-A-2007-293339 is an edge light type back light unit in which the light guide plate guides the light of the LED light source coming from a lateral side thereof to a liquid crystal panel. The light guide plate is, for example, an acrylic plate made of transparent resin having a surface specially processed for uniform planar emission of the light coming from an end face. This light guide plate enables local luminance control in response to an image signal to provide a uniform front luminance on the top surface in an area thereon.

A structure of a light guide plate and an optical distribution thereon will be briefly described below with reference to FIGS. 15A to 15C and 16.

FIGS. 15A to 15C illustrate a state in which one area of a light guide plate 10 emits light.

FIG. 16 is a graph illustrating a front luminance above the light guide plate when the one area of the light guide plate 10 emits light.

FIG. 15A is a perspective view of the light guide plate 10 seen from the top. Of areas of the light guide plate 10, only an area 10a emits light and other areas 10b do not. FIG. 15B is also a perspective view of the light guide plate 10 seen from another angle, illustrating a plurality of areas arranged in matrix form. FIG. 15C illustrates a state in which the area 10a of the light guide plate 10 emits light seen from a liquid crystal panel.

Thus, the light guide plate 10 is partitioned in areas so that the top surface (a surface facing the liquid crystal panel) of each area has a uniform luminance. Actually, the front luminance above the light guide plate 10 taken along the A-A' line of FIG. 15A is illustrated in FIG. 16.

With the light guide plate 10 which is partitioned in areas as illustrated in FIG. 15, since each area is affected by adjacent areas, a method for controlling a light-emitting state of one area and light-emitting states of other areas is a matter of importance. One possible solution for this problem is to control an area to emit light after detecting information about light-emitting states of other areas. With this method, however, since it is necessary to know and control a light-emitting state of surrounding areas in order to allow one area to emit light, an image control algorithm becomes complicated causing a problem of an increase in circuit scale.

Further, when using a light guide plate which is partitioned in areas, there is a problem that an image looks discontinuous at an area boundary. Specifically, if the light does not uniformly change at the area boundary, a problem that image discontinuity becomes noticeable arises.

Meanwhile, there is a trade-off relation between the independency of a light-emitting state of a certain area from light-emitting states of other areas and a uniform change in light-emitting state at an area boundary. For ideal area control, it is necessary to maintain a uniform front luminance above a target area which is emitting light and, while maintaining the independency of a light-emitting state for each area to a certain extent, cause leakage of a certain amount of light such that the light-emitting state uniformly changes at the area boundary.

The present invention was devised in order to solve the above-mentioned problem. The present invention is directed to providing a backlight unit having a LED light source and utilizing an area-partitioned light guide plate which provides an ideal front luminance distribution.

SUMMARY OF THE INVENTION

A backlight unit according to the present invention is provided with a light guide plate partitioned in areas each having a tapered shape formed of a thick portion and a thin portion. The light guide plate is formed such that a thick portion and a thin portion are repeated at certain intervals, and the repeated thick portions and the repeated thin portions gradually decrease in thickness. A LED light source is attached to a lateral side of each thick end. Each area of the light guide plate is partitioned by grooves formed in the light irradiation direction of the LED light source and grooves formed in a direction perpendicularly intersecting the light irradiation direction. Each of the grooves is formed in an concave shape (V-shape or trapezoid-shape). Each of the grooves in the light irradiation direction of the LED light source is deep at the thick portion and shallow at the thin portion, forming a slope bottom surface of groove. Further, each of the grooves perpendicularly intersecting the grooves in the light irradiation direction of the LED light source is formed in the vicinity of a boundary between the adjacent thick and thin portions.

There is a relation $0.2/30 <= W/D < 0.1$ where D denotes the distance from the light guide plate to a light diffusion plate and W denotes the width of a groove in the light irradiation direction of the LED light source and a groove perpendicularly intersecting the light irradiation direction. An inclination angle $\theta$ relative to the center of each of the grooves is between 9 and 15 degrees inclusive ($9 \text{ degrees} <= \theta <= 15 \text{ degrees}$).

There is another relation $0.2/30 <= D_b/T_b <= 1/2$ where $T_b$ denotes the thickness of a thickest end of the light guide plate having a taper shape and $D_b$ denotes the depth of each of the grooves in the light irradiation direction of the LED light source at the thickest end. There is still another relation $D_t/T_t <= 2/3$ where $T_t$ is the thickness of a thinnest end and $D_t$ denotes the depth of each of the grooves in the light irradiation direction of the LED light source at the thinnest end.

BRIEF DESCRIPTION OF DRAWINGS

FIG. 1 is a perspective view illustrating a structure of a backlight unit according to an embodiment of the present invention.

FIG. 2 is a lateral view illustrating the structure of the backlight unit according to an embodiment of the present invention.

FIG. 11 illustrates a front luminance distribution for leaking light to adjacent areas.

FIG. 12 illustrates an exemplary desirable front luminance distribution.

DESCRIPTION OF THE PREFERRED EMBODIMENT

Figure 3A:
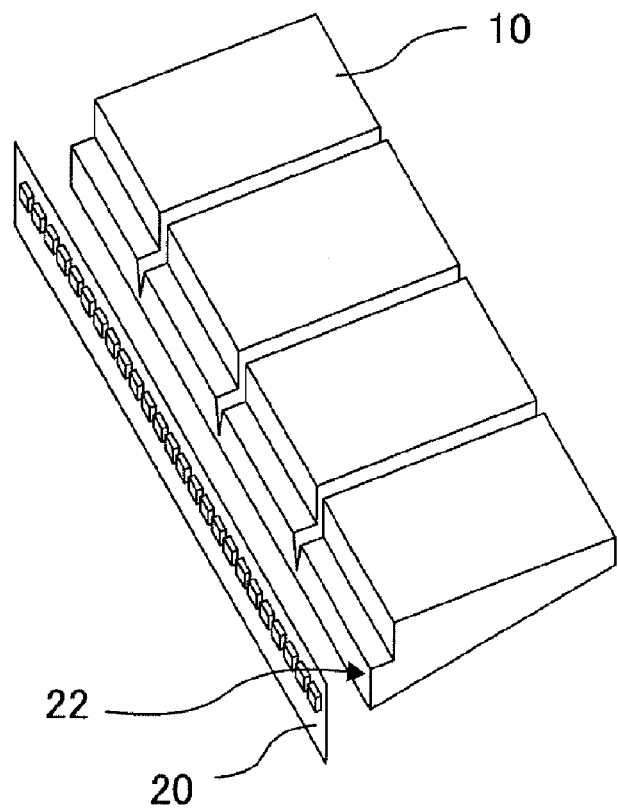
FIGS. 3A and 3B illustrate a function of a light guide plate 10 according to an embodiment of the present invention.

An embodiment according to the present invention will be described below with reference to FIGS. 1 to 14.

First of all, the structure of a backlight unit according to a first embodiment of the present invention will be described below with reference to FIGS. 1 and 2.

FIG. 1 is a perspective view illustrating the structure of the backlight unit according to an embodiment of the present invention.

FIG. 2 is a lateral view illustrating the structure of the backlight unit according to an embodiment of the present invention.

As illustrated in FIGS. 1 and 2, a backlight unit 00 according to the present embodiment is composed of a light guide plate 10, LED light source plates 20, a light diffusion plate 30, a light diffusion sheet 40, a prism sheet 50, a polarized light reflecting sheet 60, and a chassis (not illustrated).

The backlight unit 00 is a member which irradiates the liquid crystal panel 100 thereabove. The liquid crystal panel 100 serves as a display screen. Although not illustrated, the liquid crystal panel 100 is composed of a thin film transistor substrate (a TFT substrate), a color filter substrate facing the TFT substrate, and a liquid crystal layer between the TFT substrate and the color filter substrate.

Each of the LED light source plates 20, provided with a plurality of LED light sources 22 attached thereon on a line, is attached to each lateral side of the light guide plate 10. As illustrated in FIG. 1, each of the LED light source plates 20 is attached to each row as LED light source plates 20a, 20b, 20c and so on to allow each area of the light guide plate 10 to be controlled. Although not illustrated, each of the LED light sources 22 is provided with a circuit for applying a positive voltage thereto allowing the LED light sources 22 to emit light.

The light guide plate 10 is made of transparent resin, for example, an acrylics member, and reflects light coming from a lateral side to guide it toward the liquid crystal panel 100 thereabove. The structure of the light guide plate 10 will be described in detail later.

The light emitted upward by the light guide plate 10 is diffused by the light diffusion plate 30. The light passes through the light diffusion sheet 40, the prism sheet 50, and the polarized light reflecting sheet 60, and then is radiated onto the liquid crystal panel 100 providing a uniform luminance distribution on the surface thereof. The light diffusion sheet 40, the prism sheet 50, and the polarized light reflecting sheet 60 are used to obtain desired optical characteristics.

The light guide plate 10 of the backlight unit according to an embodiment of the present invention will be described below with reference to FIGS. 3 to 9.

Figure 3B:
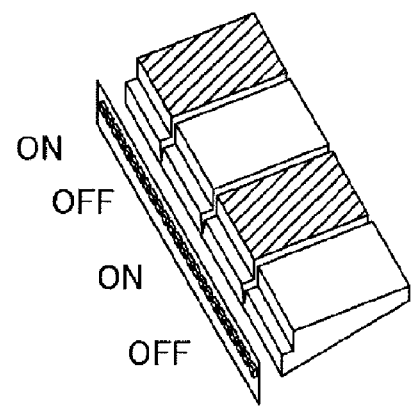

FIGS. 3A and 3B illustrate a function of the light guide plate 10 according to an embodiment of the present invention.

Figure 4:
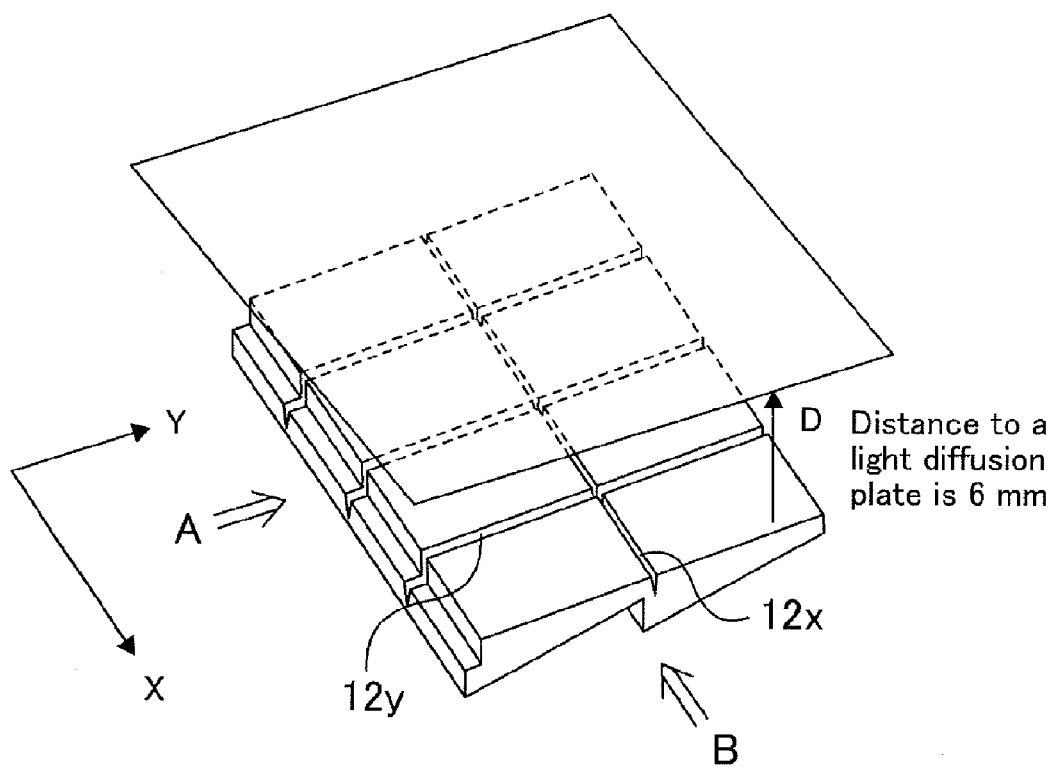
FIG. 4 is a perspective view illustrating the distance D from the light guide plate 10 to a light diffusion plate.

FIG. 4 is a perspective view illustrating the distance D from the light guide plate 10 to a light diffusion plate.

Figure 5A:
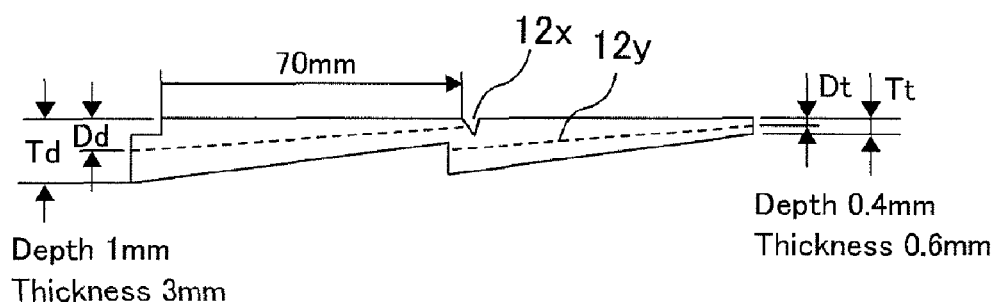
FIGS. 5A and 5B are lateral views seen from the B direction of FIG. 4.
Figure 5B:
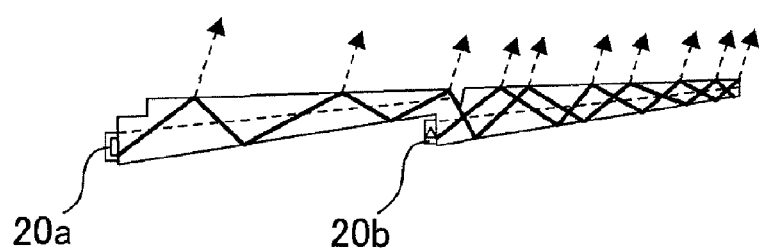

FIGS. 5A and 5B are lateral views seen from the B direction of FIG. 4.

Figure 6:
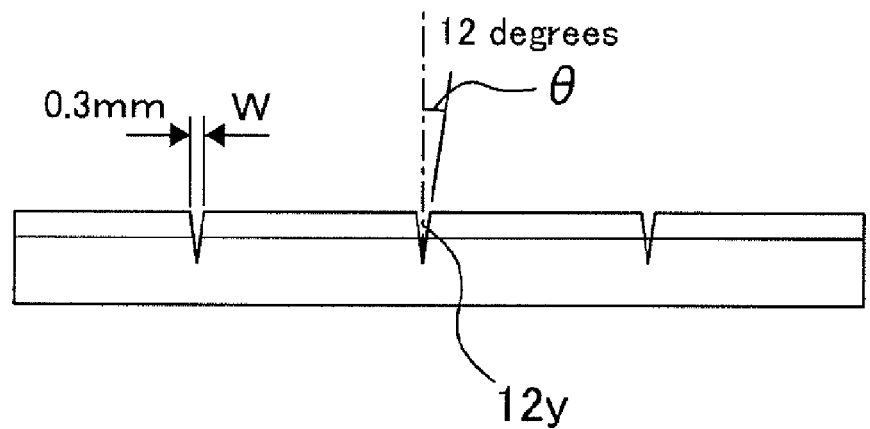
FIG. 6 is a lateral view seen from the A direction of FIG. 4.

FIG. 6 is a lateral view seen from the A direction of FIG. 4.

Figure 7:
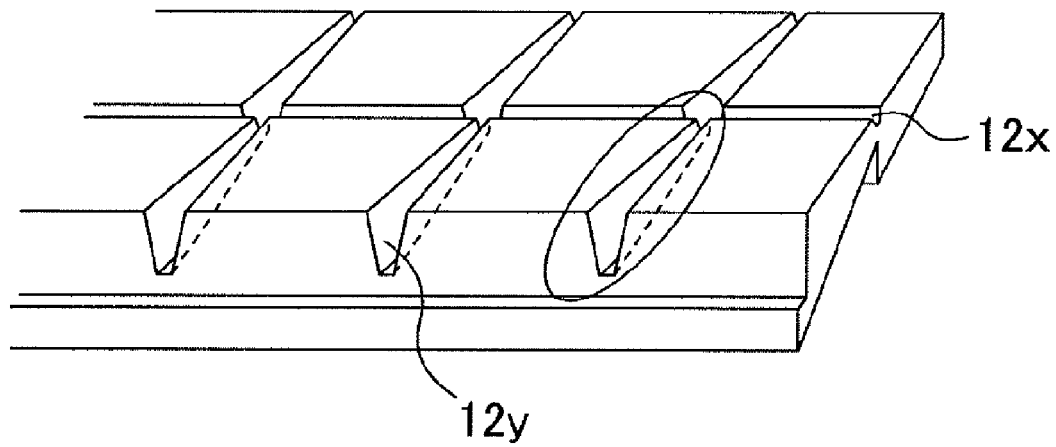
FIG. 7 is a bird's-eye view of the light guide plate 10 having grooves formed in a trapezoid-shape.

FIG. 7 is a bird's-eye view of the light guide plate 10 having grooves formed in a trapezoid-shape.

Figure 8:
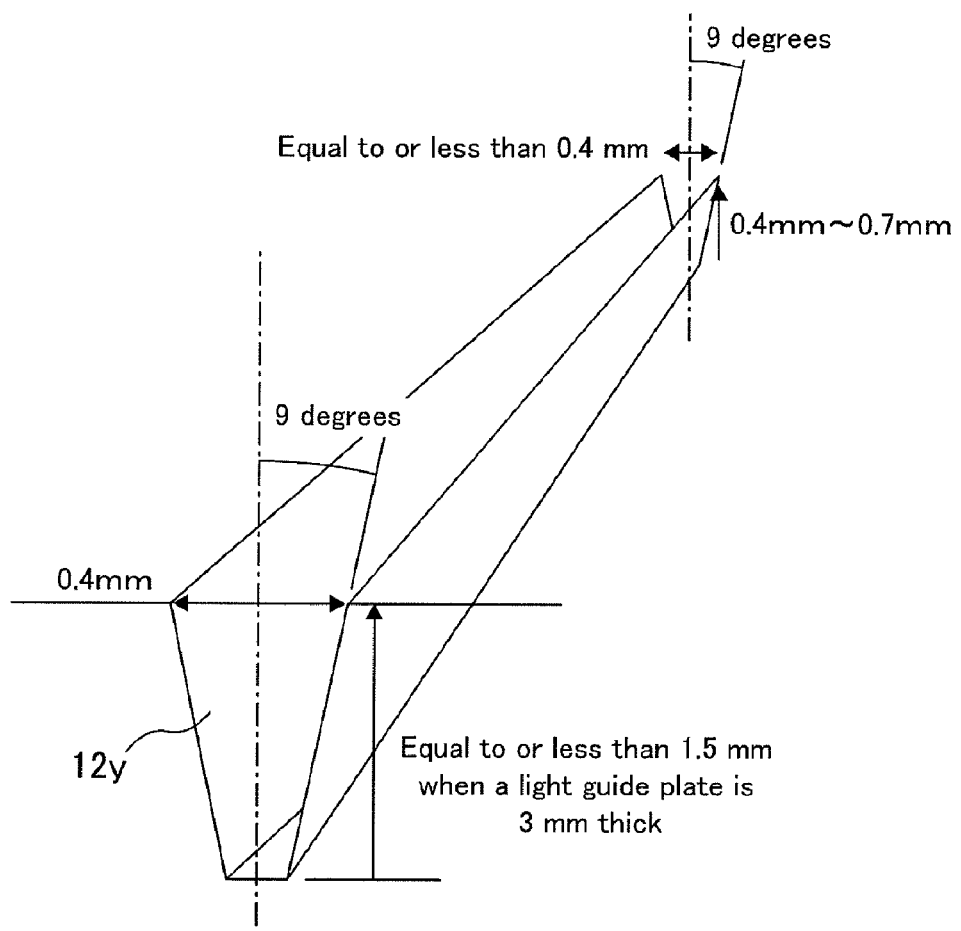
FIG. 8 is a perspective view illustrating exemplary dimensions of a groove portion formed in a trapezoid-shape.

FIG. 8 is a perspective view illustrating exemplary dimensions of a groove portion formed in a trapezoid-shape.

Figure 9A:
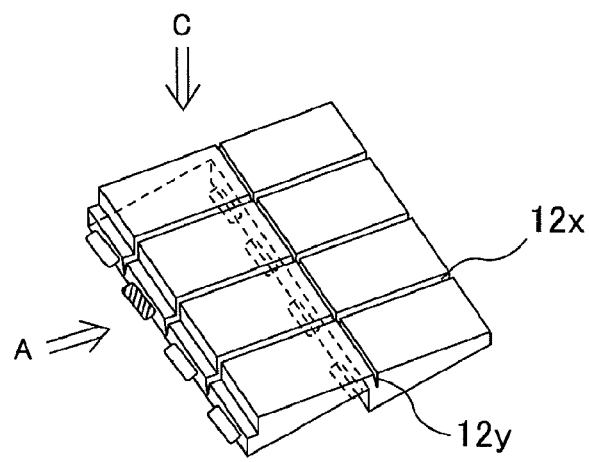
FIGS. 9A to 9C illustrate a light-emitting state in the light guide plate 10 according to an embodiment of the present invention.
Figure 9B:
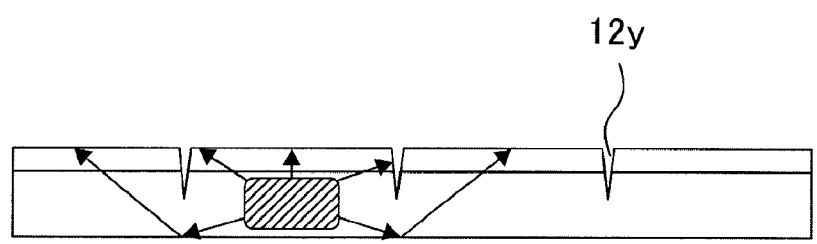
Figure 9C:
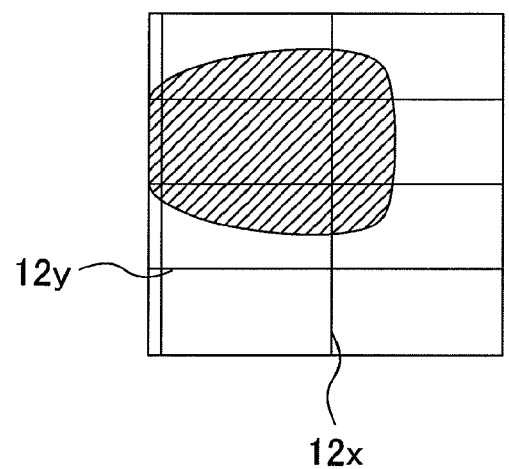

FIGS. 9A to 9C illustrate a light-emitting state in the light guide plate 10 according to an embodiment of the present invention.

Each of the LED light source plates 20 is attached to each row of the light guide plate 10, as illustrated in FIG. 3A. The luminance can be controlled locally in each area, as illustrated in FIG. 3B. Although each of the LED light sources 22 is turned on or off for each area in an example illustrated in FIG. 3B, the light quantity can be controlled in steps by controlling a current flowing in each of the LED light sources 22.

In the present embodiment, the shape of the light guide plate 10 is configured as shown below to obtain an ideal front luminance toward the light diffusion plate 30.

The light guide plate 10 is made of transparent acrylic resin. As illustrated in FIG. 4, grooves 12x and 12y are vertically and horizontally formed at equal intervals on the light-emitting surface of the light guide plate 10 made of one plate. The light guide plate 10 is partitioned by the grooves 12x and 12y in this way to form a plurality of areas in matrix form. Although the example of FIG. 4 illustrates areas in 2×4 matrix form, the entire backlight unit has areas, for example, in 8×16 or 9×16 matrix form. The light guide plate 10 may be formed of one plate in order to simplify manufacturing process and reduce unit price of manufacture. The bottom of each area is sloped from a thick portion to a thin portion. Further, the thickness of the light guide plate 10 decreases with increasing distance from the thick portion to the thin end (an end on the right-hand side in FIG. 5) providing a wedge (tapered) shape. The light guide plate is formed such that a thick portion and a thin portion are repeated at certain intervals. The repeated thick portions maybe gradually decreased in thickness. Likewise, the repeated thin portions gradually decrease in thickness.

As illustrated in FIG. 5B, the cumulative frequency of light emitted from a LED light source 22 of a LED light source plate 20 attached to each row increases with increasing distance from the thick portion to the thin end. Therefore, the tapered shape is employed so that reflection decreases with increasing distance from the thick portion to the thin end, thus providing a uniform front luminance above the light guide plate 10.

As illustrated in FIG. 5, a y-directional groove 12y is deeper at a thicker portion of the light guide plate 10 and shallower at a thinner portion of the light guide plate 10, forming a slope bottom surface of groove.

An x-directional groove 12x is formed in the vicinity of a boundary between adjacent thick and thin portions of the light guide plate 10.

With the light guide plate 10 according to the present embodiment, since areas are not separated since they are produced by forming grooves on one continuous plate member, a relation between an area subjected to light quantity control and adjacent areas is a matter of importance.

When viewed from the top, each area is rectangular-shaped. Referring to FIG. 4, for example, one x-directional side is about 70 mm long and a y-directional side is about 60 mm long.

A distance D from the light guide plate 10 to the light diffusion plate 30 is at most 8 mm, for example, 6 mm.

Referring to FIG. 6, a width W of the y-directional groove 12y of FIG. 4 is at most 0.5 mm, for example, 0.3 mm. Further, an inclination angle θ relative to the center of the groove must satisfy formula 1, for example, 12 degrees.

$$9 \text{ degrees} <= \theta <= 15 \text{ degrees} \quad \text{(Formula 1)}$$

The distance D from the light guide plate 10 to the light diffusion plate 30 and the groove width W must satisfy formula 2.

$$0.2/30 <= W/D < 0.1 \quad \text{(Formula 2)}$$

The above groove conditions also apply to the x-directional groove 12x of FIG. 4, that is, another groove perpendicularly intersecting the y-directional groove 12y. A large groove width W may cause such a luminance change that the luminance abruptly drops at the groove portion (an area boundary on the light guide plate). The area boundary maybe recognized as a bright line. Further, a long distance D from the light guide plate 10 to the light diffusion plate 30 may cause diffusion of the luminance change resulting in a uniform luminance. This makes the luminance change less noticeable. Therefore, in consideration of the fact that the human eye can recognize a luminance change of 10 cd/1 mm or less, the condition of formula 2, W/D<0.1, is preferably satisfied. Specifically, when the groove width W is large, the above-mentioned luminance change is noticeable and therefore the distance D is increased. When the groove width W is small, the above-mentioned luminance change is not noticeable and therefore the distance D is decreased. However, in consideration of the reduction depth of the liquid crystal display device, the distance D is preferably set to 8 mm or less. The groove width W is set so that both this condition and formula 2 are satisfied. Since the minimum groove width that can be formed is about 0.2 mm, and the minimum thickness of the backlight unit which can be manufactured is about 30 mm, the lower limit of W/D is set to 0.2/30. These values are clarified through experiments by the present inventors.

On the light guide plate 10, not only the thickness of each area but also the depth of the groove 12y decreases with increasing y-directional distance (increasing distance from the thick portion to the thin end).

Referring to the light guide plate of FIG. 5A, $T_b$ denotes the thickness of the thickest portion, $D_b$ denotes the depth of the groove 12x thereat, $T_t$ denotes the thickness of the thinnest portion, and $D_t$ denotes the depth of the groove 12y thereat. For example, the thickness $T_b$ is 3 mm, the groove depth $D_b$ is 1 mm, the thickness $T_t$ is 0.6 mm, and the groove depth $D_t$ is 0.4 mm.

The thickness $T_b$ and the groove depth $D_b$ are set so that formula 3 is satisfied, and the thickness $T_t$ and the groove depth $D_t$ are set so that formula 4 is satisfied.

$$0.2/30 <= D_b/T_b <= 1/2 \quad \text{(Formula 3)}$$

$$D_t/T_t <= 2/3 \quad \text{(Formula 4)}$$

As mentioned later, assume a case when a plurality of areas is arranged on the light guide plate, and one of the areas is turned on and adjacent areas are turned off. In this case, it is desirable that a certain amount of light leaks from the turn-on area to adjacent turn-off areas. If a small amount of light leaks, an image portion of the turn-on area emits light in rectangular form because the area is rectangular-shaped resulting in an unnatural image.

For example, assume a case when an image includes a white circle smaller than the area in the black background. In this case, the area including the white circle and black background is turned on, also referred to as turn-on area. Since a certain amount of the backlight leaks even when the liquid crystal panel displays black, the luminance of the black background in the lighting turn-on area is slightly different from the luminance of the black background in turn-off areas. In this case, if a small amount of light or no light leaks from the turn-on area to turn-off areas adjacent thereto, the difference in luminance between the turn-on and turn-off areas becomes noticeable resulting in an unnatural image. Conversely, if an excessive amount of light leaks, a portion not intended to emit light also emits light, reducing the effect of local backlight control (area control).

Therefore, in the present embodiment, the amount of light leak from the turn-on area to turn-off areas adjacent thereto is preferably set to 30 to 50% of the luminance at the center of the turn-on area. For that purpose, the upper limit of the groove depth Db of the thickest portion of the light guide plate is preferably set so that $D_b/T_b <= 1/2$ (formula 3) is satisfied, that is, a half or less of the maximum thickness $T_b$ of the light guide plate. Further, the upper limit of the groove depth $D_t$ of the thinnest portion (thin end) of the light guide plate is preferably set so that $D_t/T_t <= 2/3$ (formula 4) is satisfied, that is, about 2/3 of the minimum thickness $T_t$ of the light guide plate. These relations are clarified through experiments by the present inventors.

Further, the lower limit of $D_b/T_b$ in formula 3 is set to about 0.2/30 since the minimum groove depth that can be formed is about 0.2 mm, and the maximum thickness of the backlight unit 00 (including the light guide plate 10) that can be manufactured is about 30 mm. Further, since it may be not necessary to form a groove at the thin end of the light guide plate 10, formula 4 include a case when the groove depth is 0 (no groove is present).

Although, conventionally, the groove of the light guide plate 10 is formed in a V-shape, it may be formed in a trapezoid-shape having a flat bottom as illustrated in FIGS. 7 and 8. FIG. 8 is an enlarged view of a portion indicated by an ellipse of FIG. 7, illustrating exemplary dimensions of the groove 12y having a trapezoid-shape.

FIG. 9B is a lateral view seen from the A direction of FIG. 9A, illustrating light-emitting directions as well as leaks of light to adjacent areas. The shape of the light guide plate 10 illustrated in FIGS. 4 to 6 allows the quantity of leakage light to be controlled by the groove depth, and a certain amount of light propagates to adjacent areas. FIG. 9C is a top view seen from the C direction of FIG. 9A.

States of the light within the light guide plate according to an embodiment of the present invention will be described below with reference to FIGS. 10 to 14.

Figure 10:
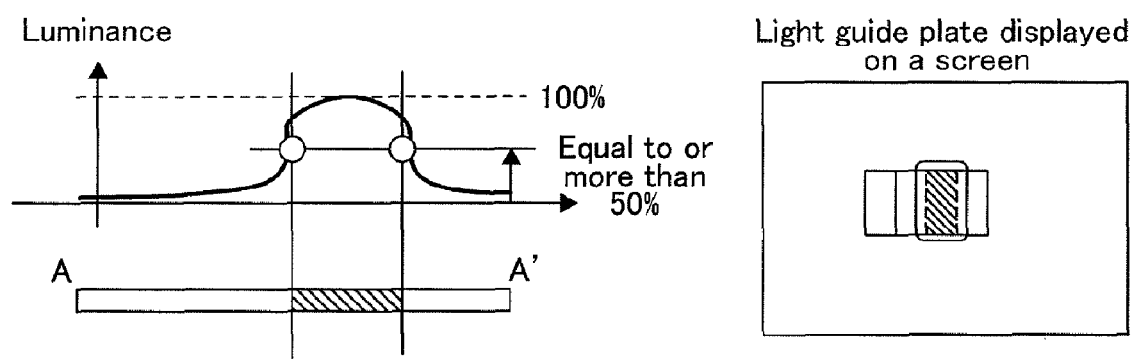
FIG. 10 illustrates a front luminance distribution for reducing influence on adjacent areas.

FIG. 10 illustrates a front luminance distribution for reducing influence on adjacent areas.

FIG. 11 illustrates a front luminance distribution for leaking light to adjacent areas.

FIG. 12 illustrates a desirable exemplary front luminance distribution.

Figure 13:
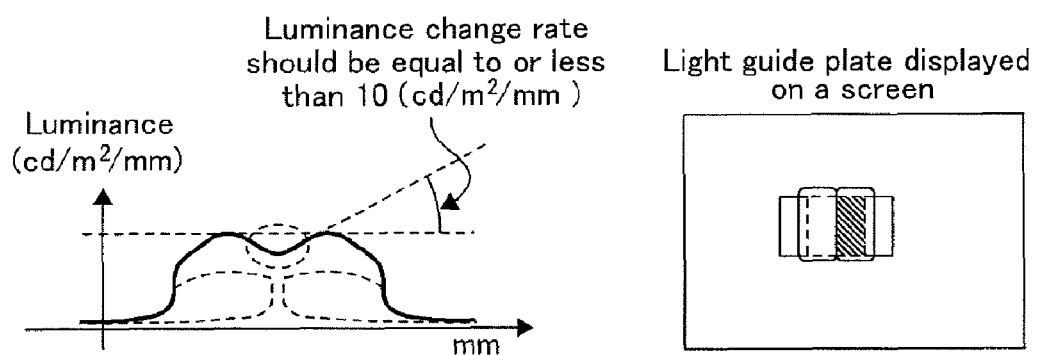
FIG. 13 illustrates a reduced luminance change rate in an area.

FIG. 13 illustrates a case when a luminance change rate in an area can be reduced.

Figure 14:
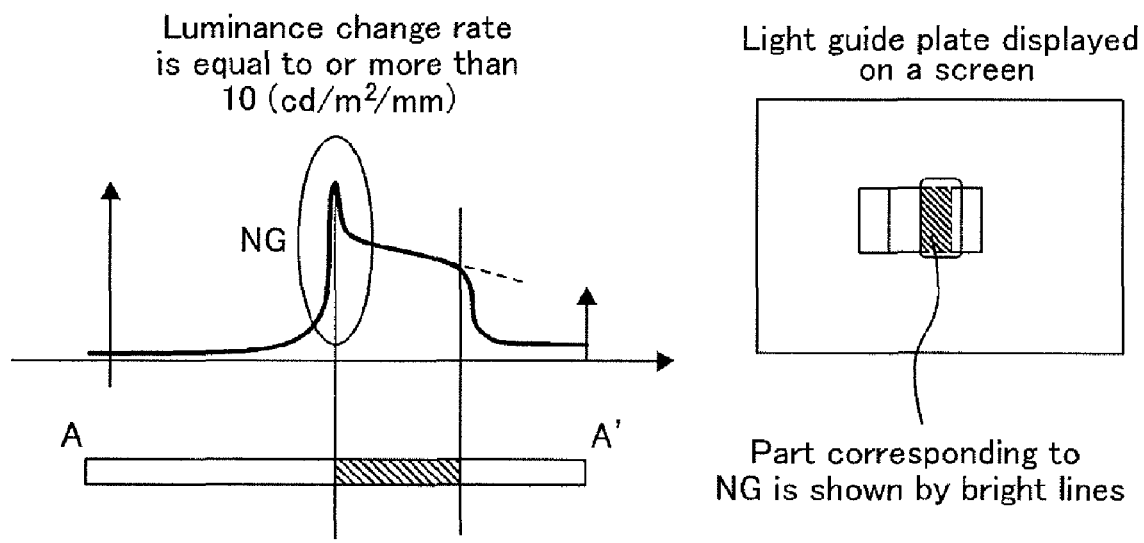
FIG. 14 illustrates a luminance change rate that cannot be reduced in an area.
Figure 15A:
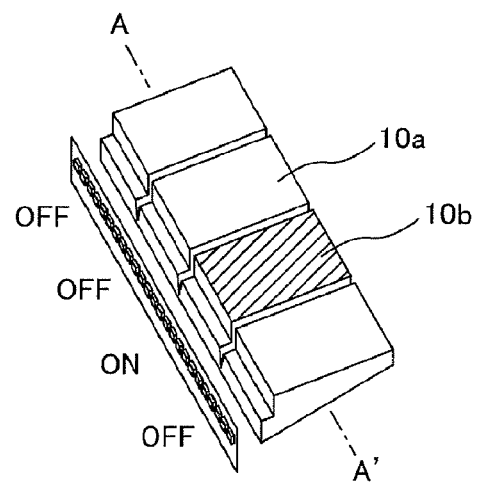
FIGS. 15A to 15C illustrate a state in which one area of the light guide plate 10 emits light.
Figure 15B:
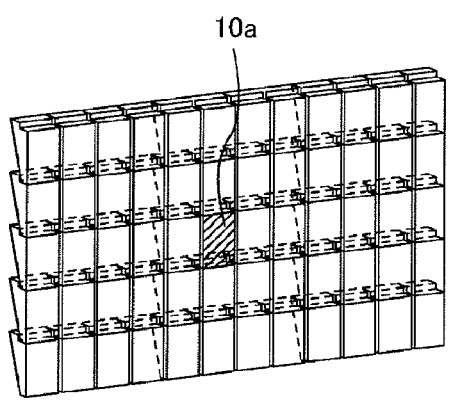
Figure 15C:
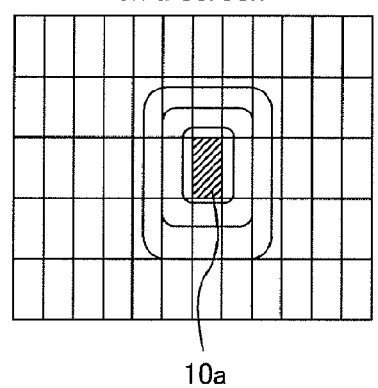
Figure 16:
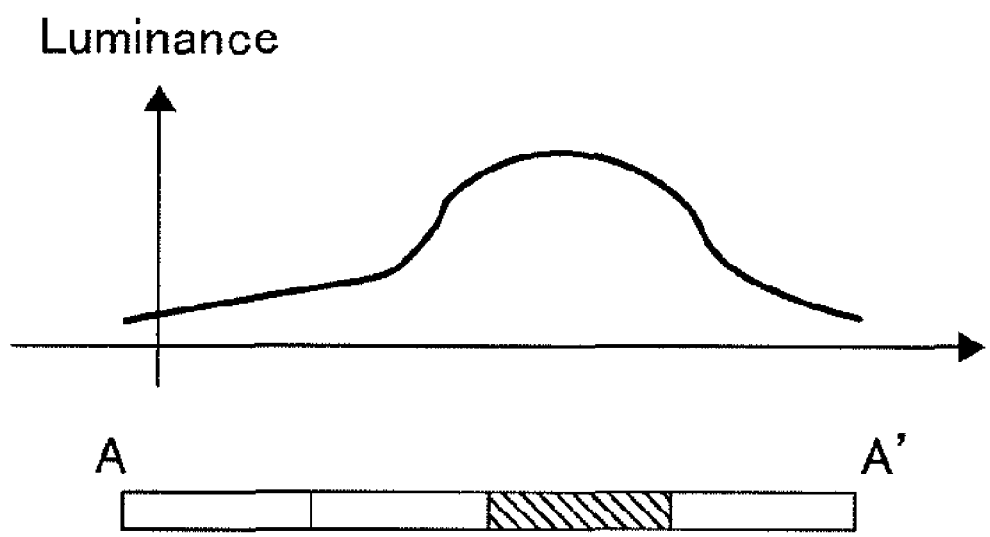
FIG. 16 is a graph illustrating a front luminance above the light guide plate 10 when the one area of the light guide plate 10 emits light.

FIG. 14 illustrates a case when a luminance change rate in are area cannot be reduced.

For each graph, the front luminance is measured at a point from the light guide plate 10 to the liquid crystal panel 100, for example, directly under the light diffusion plate 30. Further, a luminance distribution over an area and adjacent areas has been illustrated with a cross-section taken along the line A-A', the same luminance distribution also applies to an area and adjacent areas in a direction perpendicularly intersecting the line A-A'.

When a certain area is turned on and an area adjacent to the turn-on area is turned off, if 50% or more of the light quantity is ensured at an area boundary of the target area (turn-on area) to reduce influence on adjacent areas, the quantity of leakage light to the non-target area (turn-off area) can be reduced. It has been confirmed that the light guide plate 10 having the shape of FIGS. 4 to 8 can obtain a front luminance distribution illustrated in FIG. 10 satisfying this condition.

Since the brightness of the area to be controlled is dominated by the light quantity of corresponding one area, an operation algorithm for brightness control can be simplified and the amount of calculation reduced.

Further, if 10% or more of the light quantity is ensured at the area boundary of adjacent areas while satisfying the above condition, an appropriate quantity of leakage light can be ensured. It has been confirmed that the light guide plate 10 having the shape of FIGS. 4 to 8 can obtain a front luminance distribution illustrated in FIG. 11 satisfying this condition.

Actually, when the front luminance of the target area is 100%, the luminance at the center of adjacent areas is desirably set to 30% to 50% inclusive. Specifically, the ratio of the luminance at the center of a turn-off area adjacent to the turn-on area to the luminance at the center of the turn-on area is set to 0.3 to 0.5 inclusive. It has been confirmed that the light guide plate 10 having the shape of FIGS. 4 to 8 can obtain the front luminance distribution illustrated in FIG. 12 satisfying this condition.

Light leaked to adjacent areas in this way allows smooth spatial brightness change. This smooth change inevitably alleviates a brightness change at the area boundary, thus it is reduced the load of control by image display element. Control by image display element refers to control of a liquid crystal display element to achieve a uniform brightness of the backlight unit. This control is performed if the brightness of the backlight is not uniform.

Further, when an adjacent area emits light, the amount of change in luminance at an area boundary is desirably set to 10 $cd/m^2/mm$ or below. A change in luminance exceeding this value may cause a bright line at the area boundary as illustrated in FIG. 14. The amount of change in luminance equals the amount of change in luminance ($cd/m^2$) per unit length (mm). It has been confirmed that the light guide plate 10 having the shape of FIGS. 4 to 8 can obtain the front luminance distribution illustrated in FIG. 13 satisfying this condition.

As mentioned above, the present invention provides a backlight unit having a LED light source and utilizing an area-partitioned light guide plate which provides an ideal front luminance distribution.

What is claimed is:

1. A liquid crystal display device comprising:
   a liquid crystal panel; and
   a backlight unit comprising:
      a LED light source;
      a light guide plate guiding the light emitted from the LED light source toward the liquid crystal panel; and
      a light diffusion plate disposed between the light guide plate and the liquid crystal panel, and diffusing light emitted from the light guide plate and supplying the diffused light to the liquid crystal panel,
   wherein the light guide plate is partitioned in a plurality of areas, and each of the plurality of areas is provided with the LED light source so as to control the light quantity for each area; and
   wherein, when the LED light source corresponding to one of the plurality of areas is turned on and the LED light source corresponding to one of the plurality of areas adjacent to the turn-on area is turned off, the ratio of the luminance at the center of the turn-off area adjacent to the turned-on area to the luminance at the center of the turn-on area is set to 0.3 to 0.5.

2. A backlight unit comprising:
   a LED light source; and
   a light guide plate guiding the light emitted from the LED light source toward a liquid crystal panel,
   wherein the light guide plate is partitioned in a plurality of areas, and each of the plurality of areas is provided with the LED light source so as to control the light quantity for each area; and
   wherein, when the LED light source corresponding to one of the plurality of areas is turned on and the LED light source corresponding to one of the plurality of areas adjacent to the turn-on area is turned off, the ratio of the luminance at the center of the turn-off area adjacent to the turned-on area to the luminance at the center of the turn-on area is set to 0.3 to 0.5.

3. The backlight unit according to claim 2,
   wherein a light diffusion plate is disposed between the light guide plate and the liquid crystal panel, and the light diffusion plate diffuses light emitted from the light guide plate and supplies the diffused light to the liquid crystal panel.

* * * * *